United States Patent
Kubota et al.

(10) Patent No.: US 9,318,917 B2
(45) Date of Patent: Apr. 19, 2016

(54) ELECTRIC STORAGE APPARATUS AND POWER CONTROL SYSTEM

(75) Inventors: Eiichiro Kubota, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1284 days.

(21) Appl. No.: 12/731,929

(22) Filed: Mar. 25, 2010

(65) Prior Publication Data

US 2010/0262312 A1 Oct. 14, 2010

Related U.S. Application Data

(60) Provisional application No. 61/168,054, filed on Apr. 9, 2009, provisional application No. 61/168,767, filed on Apr. 13, 2009.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02J 7/34* | (2006.01) |
| *H01M 10/42* | (2006.01) |
| *H02J 3/32* | (2006.01) |

(52) U.S. Cl.
CPC .............. *H02J 7/34* (2013.01); *H01M 10/425* (2013.01); *H02J 3/32* (2013.01)

(58) Field of Classification Search
CPC ............ H02J 7/34; H02J 3/32; H01M 10/425
USPC ......................................... 700/286, 291–296
See application file for complete search history.

(56) References Cited

U.S. PATENT DOCUMENTS

| | | | | |
|---|---|---|---|---|
| 5,619,117 | A | 4/1997 | Koenck | |
| 7,619,386 | B2* | 11/2009 | Sasaki et al. | 320/106 |
| 7,956,570 | B2* | 6/2011 | Lowenthal et al. | 320/104 |
| 8,336,082 | B2* | 12/2012 | Jin | H04L 9/321 |
| | | | | 700/295 |
| 8,364,287 | B2* | 1/2013 | Pearson et al. | 700/11 |
| 8,463,449 | B2* | 6/2013 | Sanders | 700/286 |
| 2001/0010455 | A1 | 8/2001 | Brotto et al. | |
| 2006/0087286 | A1 | 4/2006 | Phillips et al. | |
| 2006/0122738 | A1* | 6/2006 | Yamada et al. | 700/295 |
| 2007/0182373 | A1 | 8/2007 | Sakakibara et al. | |
| 2008/0036425 | A1 | 2/2008 | Tashiro et al. | |
| 2008/0224541 | A1 | 9/2008 | Fukuhara | |
| 2008/0266126 | A1 | 10/2008 | Nakashima et al. | |
| 2009/0076661 | A1* | 3/2009 | Pearson et al. | 700/291 |
| 2010/0017045 | A1* | 1/2010 | Nesler et al. | 700/296 |
| 2010/0114798 | A1* | 5/2010 | Sirton | 705/412 |

(Continued)

FOREIGN PATENT DOCUMENTS

| | | |
|---|---|---|
| CN | 1728854 | 2/2005 |
| DE | 102006028930 | 12/2007 |

(Continued)

OTHER PUBLICATIONS

European Patent Office, Extended European Search Report issued in connection with European Patent Application No. 10761780.5, dated Aug. 2, 2012. (7 pages).

*Primary Examiner* — Ronald Hartman, Jr.
(74) *Attorney, Agent, or Firm* — K&L Gates LLP

(57) ABSTRACT

An electric power apparatus includes an energy device, a device manager, and a storage system manager.

13 Claims, 12 Drawing Sheets

(56) References Cited

U.S. PATENT DOCUMENTS

| | | | |
|---|---|---|---|
| 2011/0208371 A1* | 8/2011 | Duncan et al. | 700/297 |
| 2012/0130558 A1* | 5/2012 | Yoshimura | G06Q 50/06 700/297 |
| 2012/0166011 A1* | 6/2012 | Oba | G06Q 10/00 700/297 |
| 2012/0221160 A1* | 8/2012 | Hafner et al. | 700/295 |
| 2012/0310428 A1* | 12/2012 | Katagi | H02J 3/008 700/292 |
| 2014/0142768 A1* | 5/2014 | Uramoto | H02J 17/00 700/286 |
| 2015/0127186 A1* | 5/2015 | Moriai | H02J 7/0013 700/297 |

FOREIGN PATENT DOCUMENTS

| | | |
|---|---|---|
| EP | 1667306 | 6/2006 |
| JP | 2000-224770 | 8/2000 |
| JP | 2006-158146 | 6/2006 |
| JP | 2008-295159 | 12/2008 |

* cited by examiner

ELECTRIC STORAGE APPARATUS AND POWER CONTROL SYSTEM

CROSS REFERENCES TO RELATED APPLICATIONS

The present application claims priority to U.S. Provisional Patent App. No. 61/168,054 filed on Apr. 9, 2009, and U.S. Provisional Patent App. No. 61/168,767 filed on Apr. 13, 2009, the entire contents of which are being incorporated herein by reference.

BACKGROUND

The present disclosure relates to an electric storage apparatus and a power control system that may be adapted to a home electric storage apparatus.

Recently, use of renewable energy has been actively researched and developed in order to break from dependency on fossil fuels. As power generation using the renewable energy, there are solar photovoltaic power generation, wind power generation, fuel cells, biomass power generation, wave-activated power generation, and the like. In the case where the renewable energy is used, there are problems in that the amount of power generation varies with natural conditions and in that deficiency and excess occur with respect to power consumption.

In order to solve the problems, there has been contrived and utilized a technology. In the technology, a storage battery is installed in each home, and an output power of the solar photovoltaic power generation or the like is temporarily stored in an electric storage apparatus (hereinafter, properly referred to as a storage), and the output power of the storage is used according to the power consumption. In other words, a lithium ion battery or other storages are installed in a distributive environment in the home or around the home, and the in-home power consumption is controlled by HEMS (home energy management system). More specifically, the peak of the in-home power consumption is in a flat behavior; time shift of storing the power in a time period where the power is inexpensive and discharging and consuming the power in a time period where the power is expensive is implemented; surplus power generated by the power generation apparatus such as solar cells is accumulated; and the quality of power is stabilized.

However, the above technology has problems in that the cost is high, in that the shape or weight is large, and in that maintenance or safety management method is not ensured. If various applications are commonly used through standardization of the storage and if recycling proceeds through the charging control and the life cycle management by using a network, it may be expected to effectively use resources and to reduce the cost.

SUMMARY

The embodiments provide an electric storage apparatus and a power control system capable of greatly reducing installation cost of a battery or a home storage by configuring the home storage with an energy device such as the battery which can be used for a single application or a plurality of applications.

According to an embodiment, there is provided an electric power apparatus including: an energy device; a device manager; and a storage system manager. The energy device may have an ID and performs mutual authentication with respect to the storage system manager by using the ID.

The device manager may receive or transmit storage information from or to the storage system manager via an information bus.

In addition, the device manager or the storage system manager may receive or transmit the storage information from or to a home controller which controls the home electric power.

The storage system manager and the home controller may perform mutual authentication.

The device manager or the storage system manager may receive or transmit the storage information from or to a server on a network.

The device manager or the storage system manager may receive or transmit the storage information from or to a power regulating apparatus.

The device manager, the storage system manager, or the home controller may acquire storage control information from the server on the network.

The device manager, the storage system manager, or the home controller may control the energy device according to the storage control information.

According to another embodiment, there is provided an electric power apparatus including: a storage system manager; a first electric power module having a first energy device and a first device manager; and a second electric power module having a second energy device and a second device manager.

According to another embodiment, there is provided a power control system including: an electric power apparatus having an energy device, a device manager, and a storage system manager; a home controller; and a power regulating apparatus.

The device manager or the storage system manager may receive or transmit storage information from or to a network, the home controller, or the power regulating apparatus.

The home controller, the storage system manager, or the device manager may control the power regulating apparatus according to the storage information for controlling the power supply to the electric power apparatus.

The home controller, the device manager, or the power regulating apparatus may monitor power consumption to acquire information on the power consumption.

The home controller, the storage system manager, the device manager, or the power regulating apparatus may control the power supply to the electric power apparatus or the power supply to a power storage unit according to the information on the power consumption.

The home controller, the storage system manager, the device manager, or the power regulating apparatus may control increasing or initiating of the power supply to the electric power apparatus or the power storage unit in the case where the power consumption is small and/or control increasing or initiating of the power supply from the electric power apparatus or the power storage unit in the case where the power consumption is large.

The home controller, the storage system manager, the device manager, or the power regulating apparatus may control optimization of the power supply amount from a power supply network according to the power consumption.

The home controller, the storage system manager, the device manager, or the power regulating apparatus may control decreasing or stopping of the power supply from the power supply network in the case where the power consumption is large and/or control increasing or initiating the power supply to the power supply network in the case where the power consumption is small.

The home controller, the storage system manager, the device manager, or the power regulating apparatus may control the power supply to the electric power apparatus according to information supplied from the server on the network.

The home controller, the storage system manager, the device manager, or the power regulating apparatus may control the power supply to the electric power apparatus or the power storage unit and/or the power supply from the electric power apparatus or the power storage unit according to detected information.

The home controller, the storage system manager, the device manager, or the power regulating apparatus may control power supply to a power supply network and/or the power supply from the power supply network according to the detected information.

The home controller, the storage system manager, the device manager, the power regulating apparatus may predict the power consumption according the detected information or the supplied information.

The home controller, the storage system manager, the device manager, or the power regulating apparatus may control the power supply to the electric power apparatus according to the predicted power consumption.

In addition, mutual authentication may be performed between at least two of the energy devices, the device manager, the storage system manager, the home controller, the power regulating apparatus, and the network.

According to the embodiment, by standardizing (communizing) the input and output scheme, the charging interface scheme, and the authentication scheme of the energy device such as a battery used for the storage and performing the device management through the network, it is possible to safely use the energy device and to use the energy device for various applications. Accordingly, the cost of the energy device is reduced, so that it is possible to extend new applications driven with a battery and to improve convenience of energy device management for a user.

In addition, according to the embodiment, the standardized device may be used as the home storage. Accordingly, it is possible to flexibly expand the capacity or configuration of the storage according to customer's purpose without large initial investment. In addition, it is possible to effectively use various types of batteries for applications and to facilitate resources saving and space saving.

Additional features and advantages are described herein, and will be apparent from the following Detailed Description and the figures.

DETAILED DESCRIPTION

Hereinafter, exemplary embodiments are described. In addition, the embodiments described hereinafter are detailed and appropriate examples, and various technical limitations are preferably added.

Schematic Configuration of Power Control System

Figure 1:
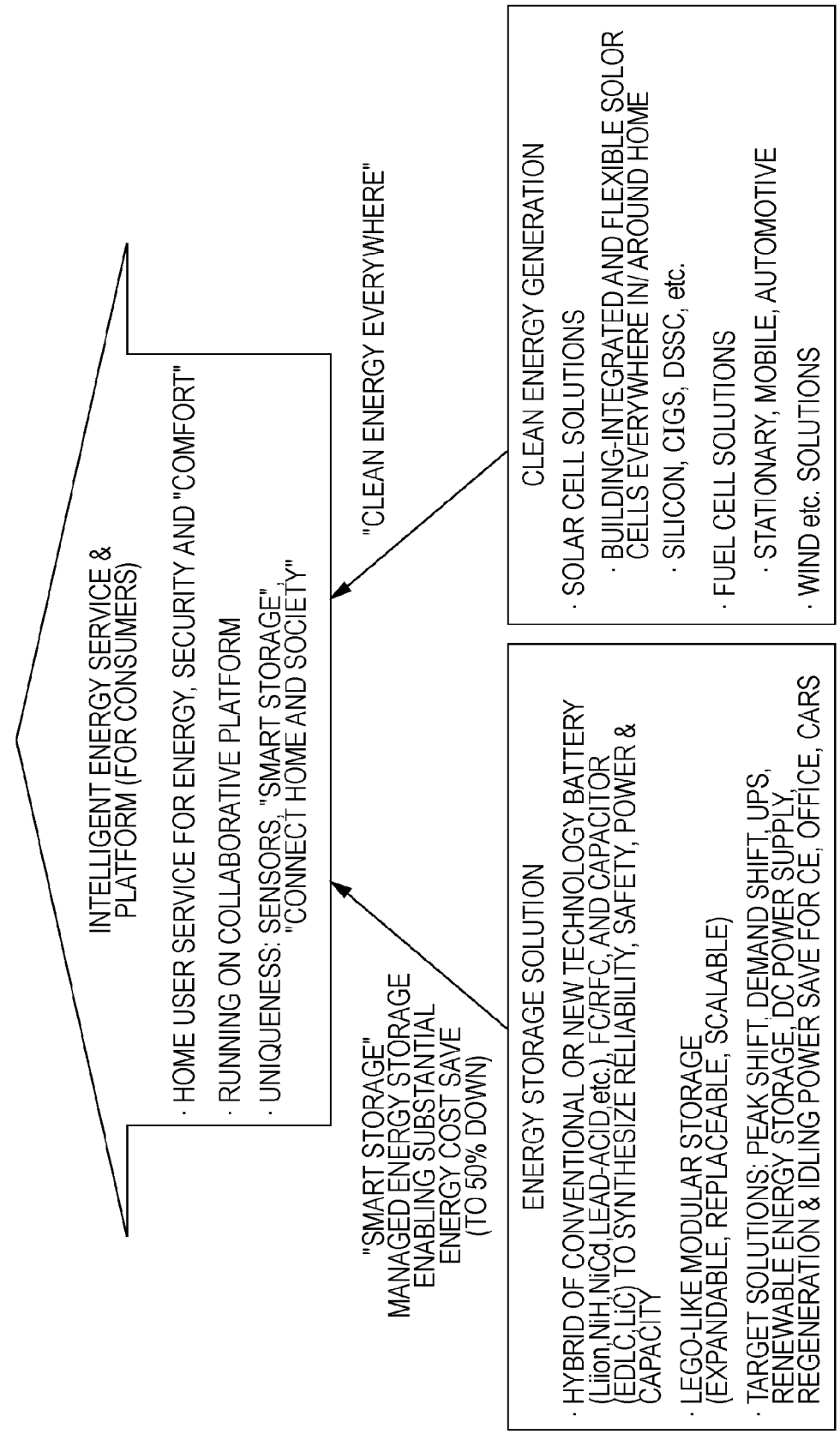
FIG. 1 is a schematic block diagram illustrating a configuration of a power control system according to an embodiment.

As shown in FIG. 1, a power control system according to the embodiment has a configuration where the power control system provides a user service associated with power, security, and comfort of home and operates on a common platform in connection among sensors, electric power apparatuses (referred to as a smart storage) according to the embodiment, home, and society. A solution to power storage problem described later is implemented by the smart storage. In addition, power of clean energy generation such as photovoltaic power generation, fuel cell, and wind power generation is supplied to the home.

Figure 2:
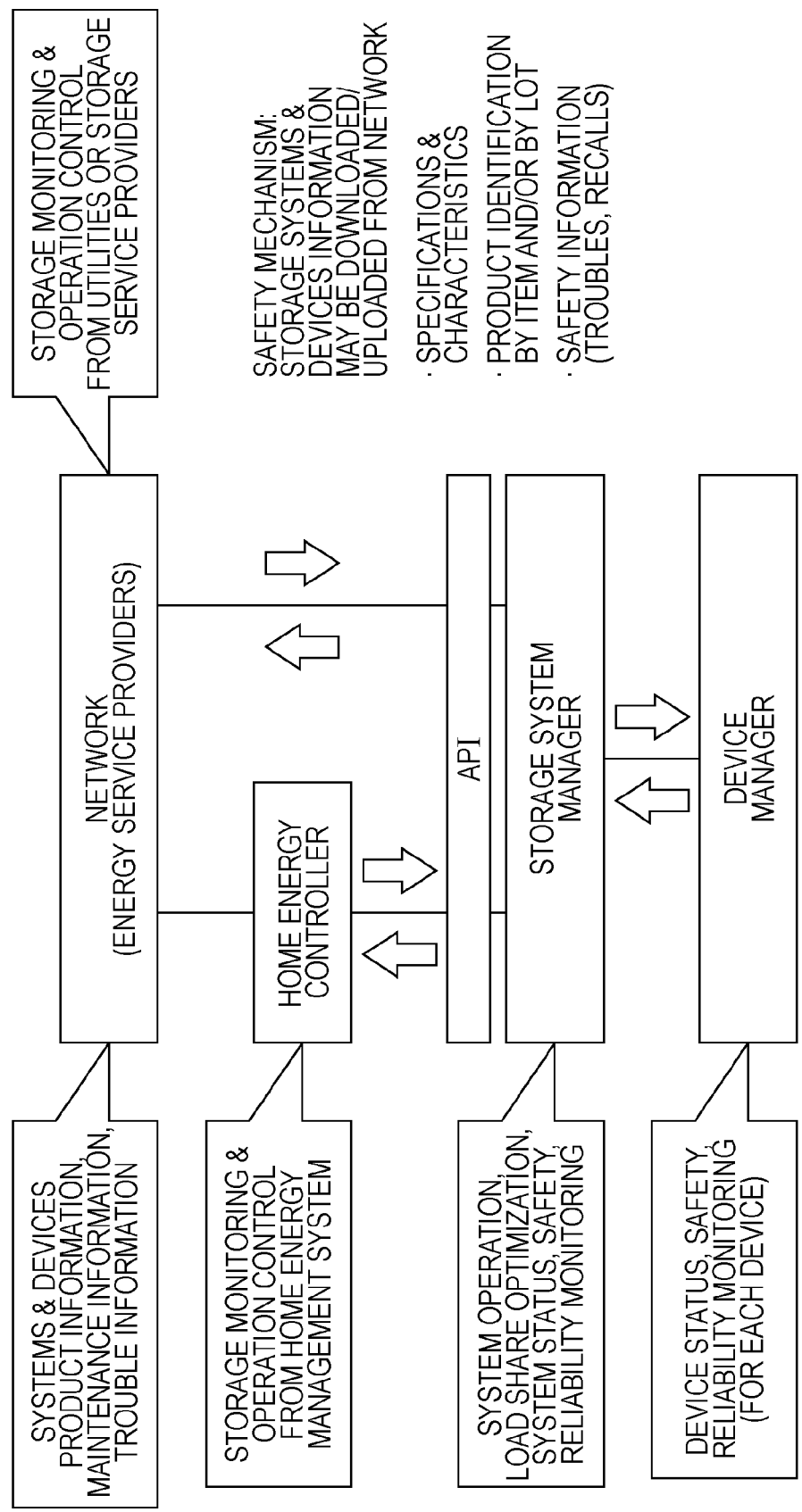
FIG. 2 is a schematic diagrammatic view illustrating an example of a software architecture of a smart storage according to an embodiment.

The power control system according to the embodiment includes an energy device, an electric power apparatus having a device manager and a storage system manager, a home controller, and a power regulating apparatus (hereinafter, referred to as a power conditioner). In addition, the power control system includes a network. The network includes an electric power company, an energy service provider, a communication service provider, a storage supplier, a mobile information terminal, a mobile computer, and a combination thereof Software Architecture of Smart Storage FIG. 2 schematically illustrates an example of a software architecture of the smart storage. The software which performs control closest to a battery as the energy device is the device manager. The device manager monitors the status, safety, and reliability of each device.

The storage system manager is connected to the device manager. The storage system manager monitors system operations, optimization of load allocation, and the status, safety, and reliability of the system.

The storage system manager is connected to a home energy manager through an API (application programming interface). In addition, the storage system manager transfers information with respect to a server on the network through the network. The home energy manager transfers information with respect to a server on the network through the network.

The home energy manager performs monitoring of the storage and controls the operations of the storage. In this case, the home energy manager receives manufacturing information, maintenance information, and trouble information of the device from the server on the network.

The storage monitoring and the storage operation controlling of the storage system manager is provided through the network by the energy service provider or the storage service provider.

Figure 3:
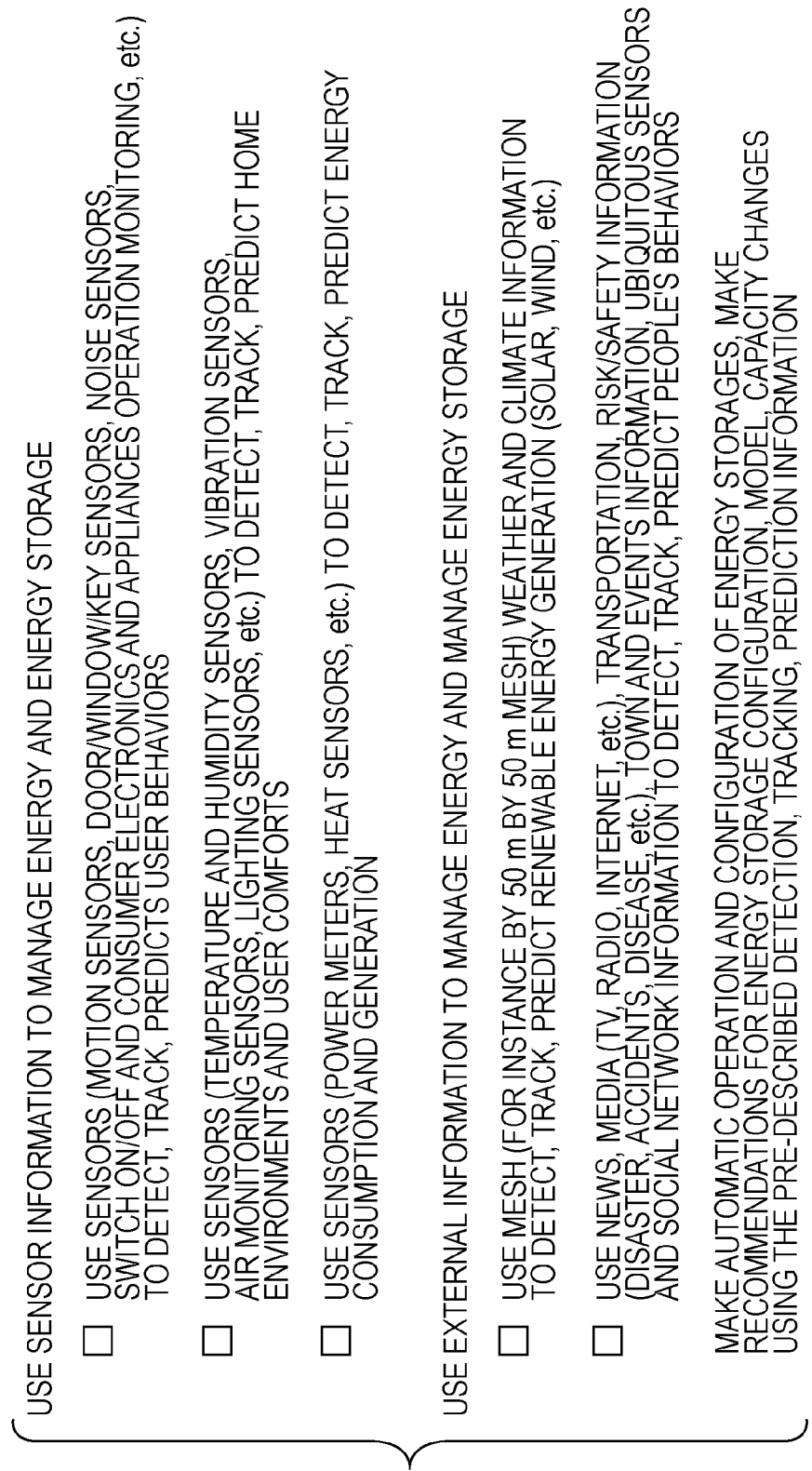
FIG. 3 is a schematic diagrammatic view illustrating information that is used for energy management and energy storage management according to an embodiment.

The information shown in FIG. 3 is used for the energy management and the energy storage management. The information on the sensors is used for the energy management and the energy storage management. The information on the in-home sensors is used to detect, track, and predict user's behavior. More specifically, the information on motion sensors, door/window/key sensors, and the noise sensors, and information of on and off of switches, information of operations of electronic apparatuses and home electrical appliances are used. In addition, personal schedule information, user's personal information, and a combination thereof are used.

The information of the in-home sensors is used to detect, track, and predict home environment and user's comfort. More specifically, information of temperature/humidity sensors, vibration sensors, air monitoring sensors, brightness sensors, and the like is used.

The information of a power meter, a thermal sensor, and the like is used to detect, track, and predict energy consumption and generation.

In addition to the aforementioned in-home sensors, external information is used to manage the energy and the energy storage.

Information of mesh (for example, 50 m×50 m) climate and Information of local weather condition are used to detect, track, and predict power generation (photovoltaic power generation, wind power generation, and the like) using renewable energy.

Information of news, media (TV, radio, the Internet, and the like), information of transportation, information of risk/safety (disaster, accident, disease, and the like), information on town and event, information of ubiquitous sensors, and information of social network are used to detect, track, and predict behaviors of persons. In other words, the sensors monitor temperature, humidity, brightness, persons' behaviors, or a combination thereof indoors or outdoors.

A recommendation of automatic operations and configuration of the energy storage, a configuration, model, and capacity of the energy storage may be changed by using home information and external information for the aforementioned detection, tracking, and prediction.

Figure 4:
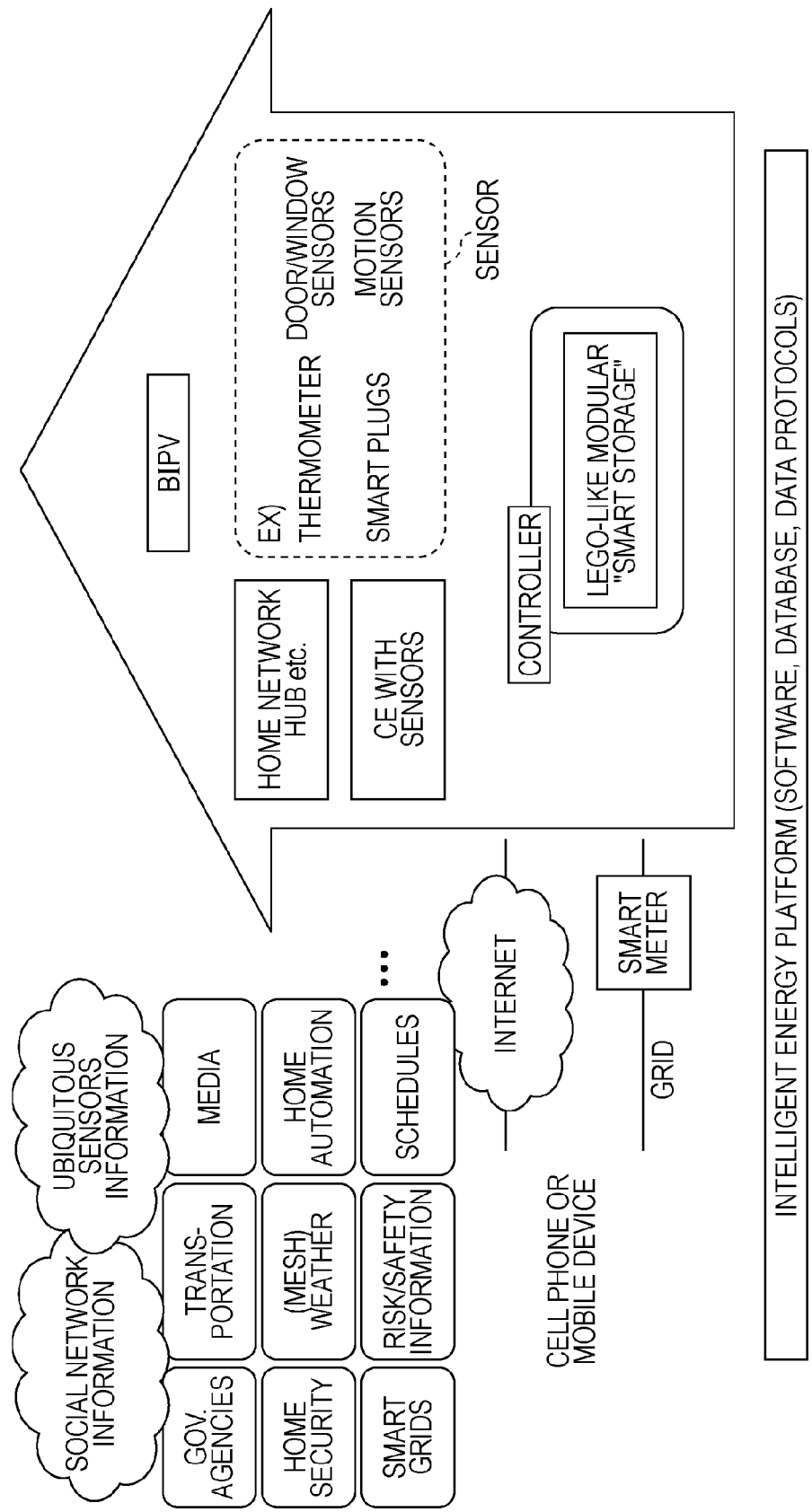
FIG. 4 is a schematic diagrammatic view illustrating a layout of energy management and energy storage management according to the embodiment.
Figure 5:
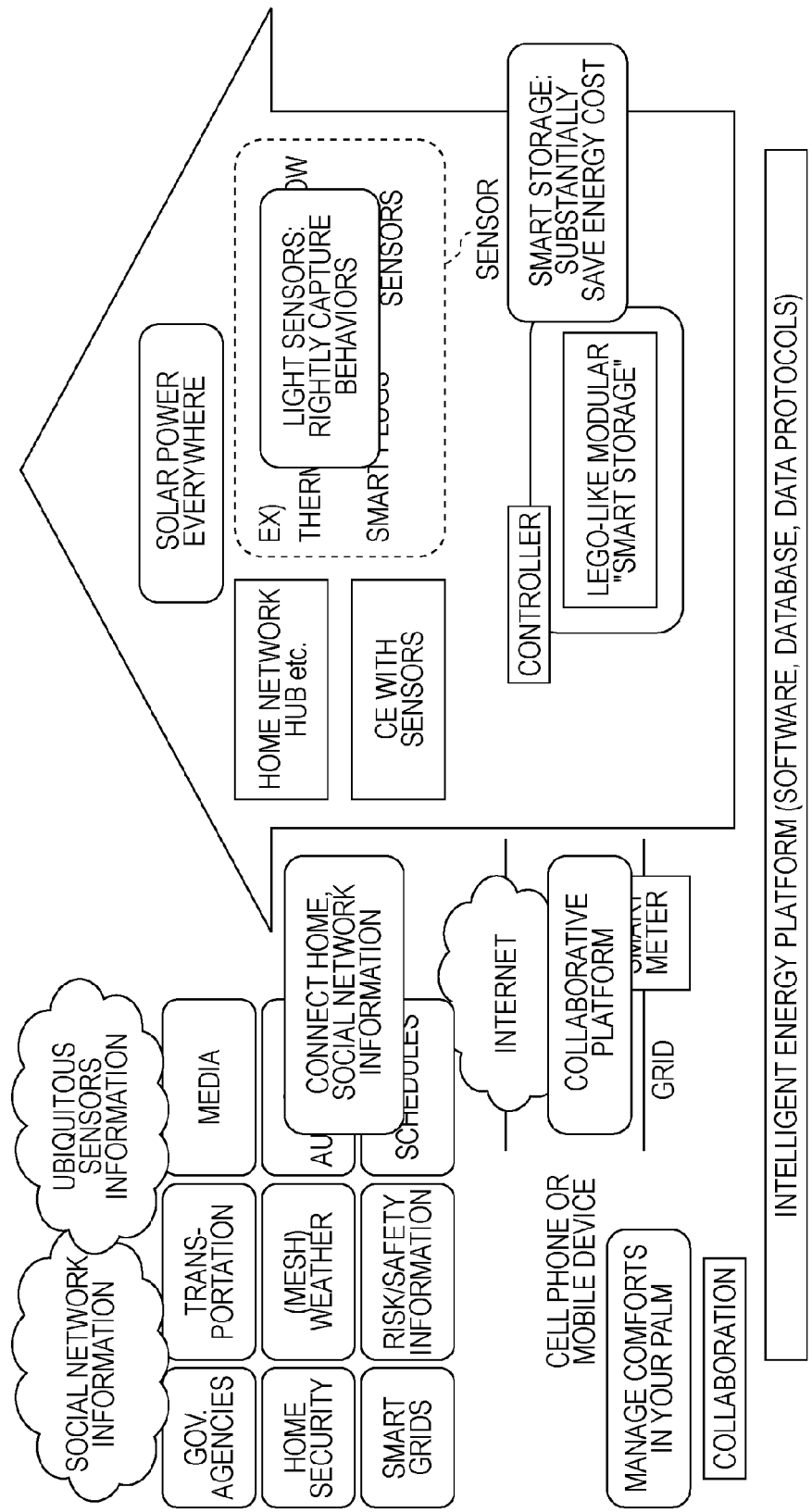
FIG. 5 is a schematic diagrammatic view illustrating a layout of energy management and energy storage management according to an embodiment.

Schematic layout of the energy management and the energy storage management is shown in FIGS. 4 and 5. A home network hub, sensors, a smart storage, a controller for the smart storage, an electronic apparatus having a sensor, and a solar photovoltaic power generation module (for example, BIPV (building integrated photovoltaic module)) are provided in the home. The components are connected through a smart meter to a grid. In addition, external information may be introduced through the Internet into the home.

Figure 6:
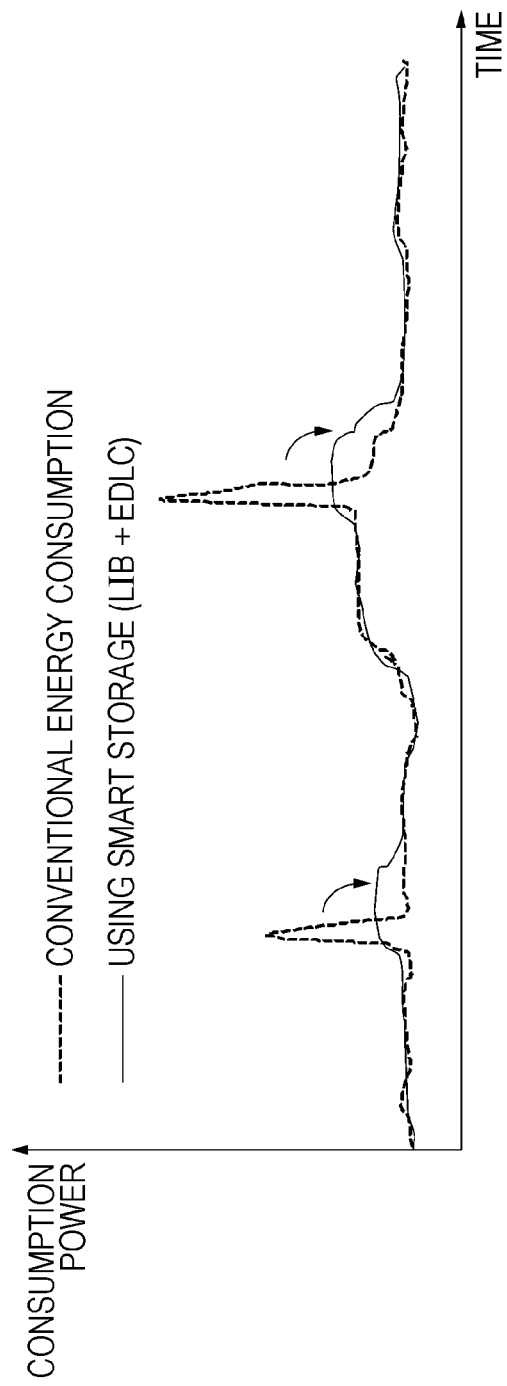
FIG. 6 is a schematic diagrammatic view illustrating power peak shift performed by a storage according to an embodiment.

The power peak shift may be implemented by using the in-home smart storage (for example, a lithium ion battery and an electric double layer are used as the energy device). FIG. 6 schematically illustrates peak shift. In the case where power consumption indicated by the dotted line is obtained in the related art, the peak of the power consumption may be suppressed down to the peak indicated by the solid line by using the power stored in the smart storage. In addition, since the power stored in the smart storage can be implemented by power generation using a renewable energy, the carbon emission of the home may be suppressed.

In the related art, since the home storage battery is used to only compensate for the in-home power consumption, the home storage battery is large and expensive. The smart storage according to the embodiment is used for the battery used in the home storage battery and for other applications, for example, a battery used as a driving force of an electric bicycle, so that the problem in the related art may be solved.

Figure 7:
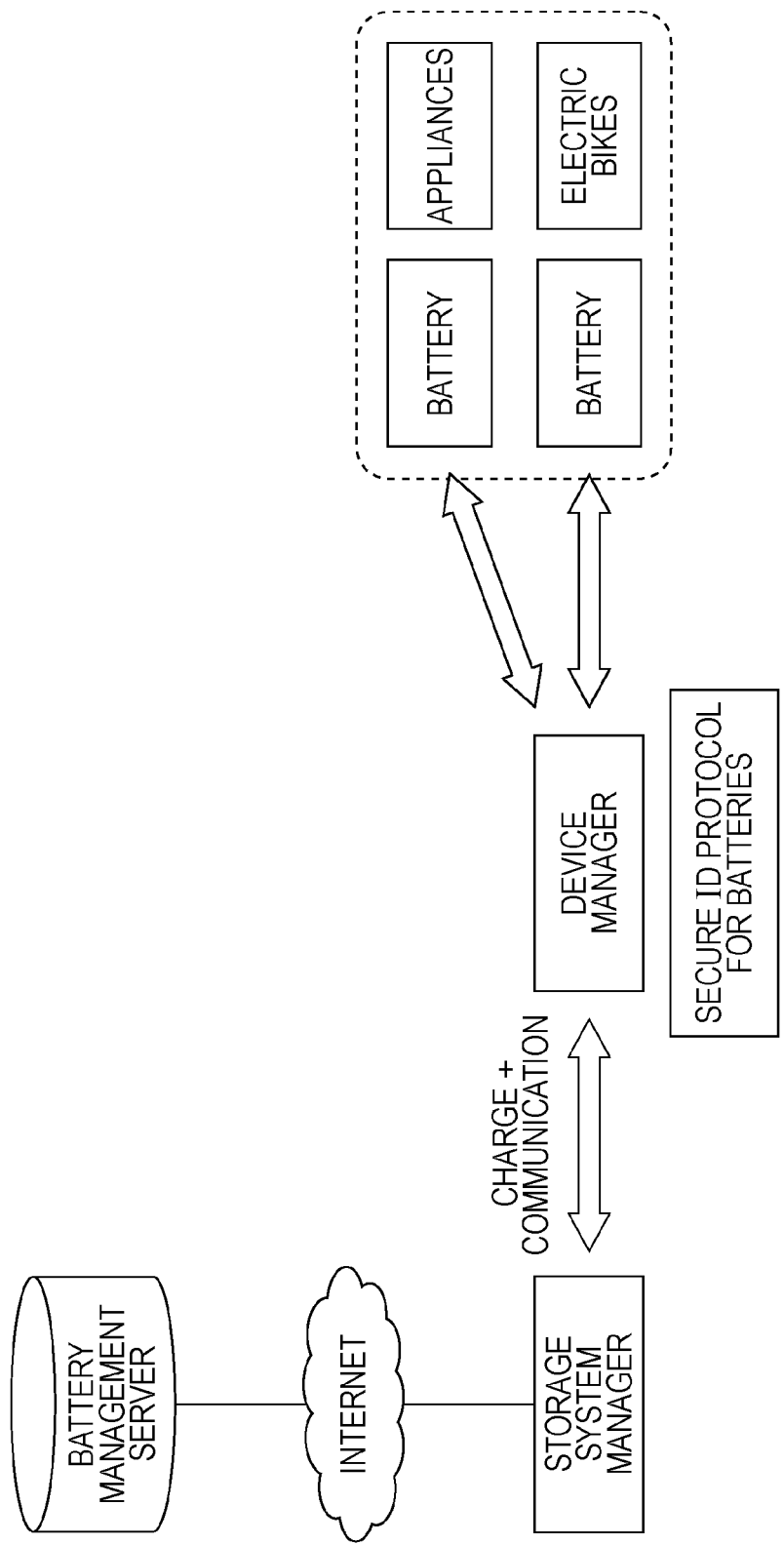
FIG. 7 is a schematic diagrammatic view illustrating a power control system according to an embodiment.

As shown in FIG. 7, the battery communicates with the home energy gateway. The home energy gateway charges the battery and allows the battery to function as the home storage battery. The home energy gateway is connected through the network (for example, the Internet) to the battery management server.

The battery is configured to be uniquely identified by a secure battery identifier (battery ID). The battery management server manages batteries according to the battery IDs. In other words, the database of information (for example, information for charging, recall information, and the like) necessary to use the battery specified by the battery ID is constructed by the battery management server.

The home energy gateway may safely or appropriately charge the battery by using the storage information corresponding to the battery ID from the server. In addition, the information (charging times, trouble, and the like) of the using result of the battery is transmitted from the home energy gateway to the server, so that the storage information of the database of the server is updated to the latest information.

On the other hand, the battery is configured to be detachable so that the detached battery may be used for other applications. In other words, the battery may be used as a source of a driving force of an electric apparatus, for example, an electric bicycle. The application is not limited to the electric vehicle, but the battery may be used for an electric automatic bicycle, an electric bicycle, a storage battery type consumer electronic apparatus, a storage battery type office apparatus, a storage battery type calculator, a storage battery type portable apparatus, various storage battery apparatus, and a combination thereof. In this manner, although the battery is used as a power source other than the home storage battery, since the control and the charging apparatus are commonly provided to plural types of the batteries, the home storage battery may be configured at low cost without the expense of the safety. In addition, if the battery is configured to be charged by the power using the renewable energy at home, the carbon emission may be reduced.

Figure 8:
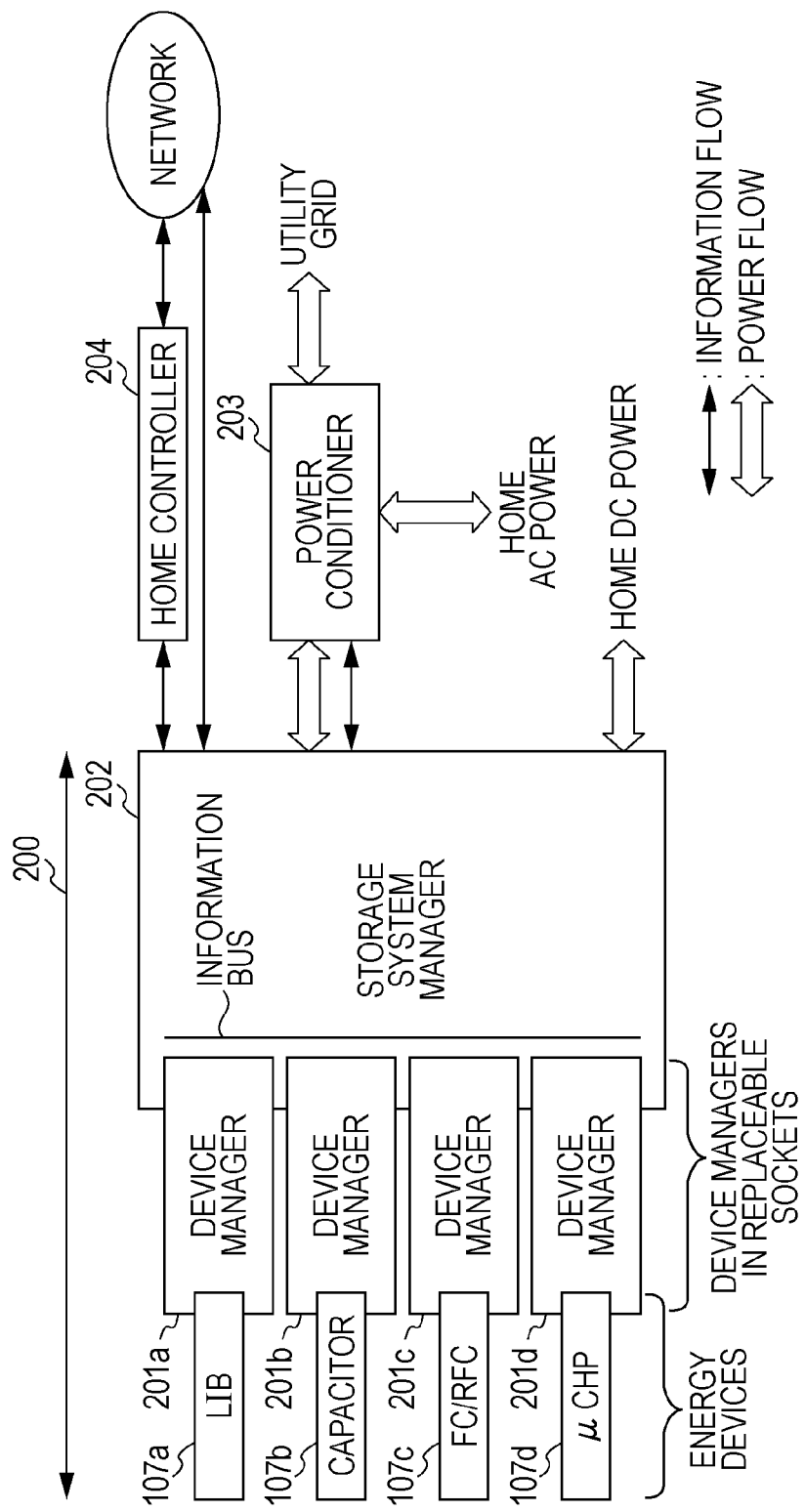
FIG. 8 is a block diagram illustrating an example of a smart storage according to an embodiment.

FIG. 8 illustrates the configuration of the smart storage 200 according to the embodiment more in detail. In FIG. 8, as an example, four batteries 107a, 107b, 107c, and 107d are controlled by device managers 201a, 201b, 201c, and 201d, respectively. In addition, the number of batteries is an example, but N batteries may be connected. Particularly, in the case where the batteries and the device managers may not have to be distinguished from each other, reference numerals "107" and "201" are used.

The device manager 201 has a plurality of sockets as physical connectors. Each battery 107 is inserted to the socket. Different types of batteries may be used for the batteries 107. For example, a lithium-ion battery, a capacitor, a fuel cell, a micro generator, and the like may be used. Although the types of the batteries 107 are different, the batteries 107 may be inserted into the standardized sockets.

The socket physically supports the battery 107 and ensures an interface between the battery 107 and the device manager 201. The interface has at least positive and negative power terminals and a terminal for outputting the battery ID. In addition, the interface may be provided with a terminal for extracting a result of detection of a temperature of the battery 107. In addition, in the case where the battery 107 is embedded with a microcomputer, a communication terminal for communication between the microcomputer and a microcomputer of the device manager 201 is provided.

The device manager 201 manages the energy device (battery 107) status and monitors the safety and the reliability. The device manager 201 is connected to the storage system manager 202. Signals are transferred via a common information bus in the storage system manager 202.

AC power is supplied to the storage system manager 202 through the power regulating apparatus 203. The power regulating apparatus 203 is connected to the power network and the home AC power line. The energy that is generated by using the in-home renewable energy such as solar photovoltaic power generation is supplied to the power regulating apparatus 203. DC power is also supplied to the storage system manager 202. The device manager 201 and the storage system manager 202 supply the information on the storage through the network to the home controller 204 or the power conditioner 203.

The storage system manager 202 or the device manager 201 controls the power conditioner 203 based on the information on the storage for controlling the power being supplied to the electric power apparatus. The home controller 204, the device manager 201, or the power conditioner 203 monitors power consumption, acquires information on the power consumption, and controls the power being supplied to the smart storage based on the information on the power consumption. In addition, the power consumption may be predicted, so that the power being supplied to the smart storage is controlled based on the predicted power consumption.

In other words, in the case where the power consumption is small (or the electric power is inexpensive), the power being supplied to the smart storage is controlled so as to be increased; and/or in the case where the power consumption is large (or the electric power is expensive), the power supplying from the smart storage is controlled so as to be increased. In addition, in the case where the power consumption is large (or the electric power is expensive), the home controller 204, the device manager 201, or the power conditioner 203 controls the power supplying from the power supply network to be decreased or stopped; and/or in the case where the power consumption is small (or the electric power is inexpensive), the home controller 204, the device manager 201, or the power conditioner 203 controls the power being supplied to the power supply network to be increased or initiated.

The storage system manager 202 is connected to the home controller 204. The in-home energy is managed by the home controller 204. For example, in order to implement the aforementioned peak shift, the energy of the battery 107 is used. The home controller 204 and the storage system manager 202 are connected to the server through the network. The information of the in-home sensors, the information of the outdoor sensors, and external information are supplied to the home controller 204 and the storage system manager 202.

As described above, the information on motion sensors, door/window/key sensors, and the noise sensors, and information of on and off of switches, information of temperature and humidity sensors, and the like are used. As the external information, there are climate information, transportation information, and the like. The home controller 204 manages the in-home energy by using the information.

The storage system manager 202 is connected through the network (for example, the Internet) to the battery management server (refer to FIG. 7). For example, product information, maintenance information, trouble information, and the like of the system and the devices are transmitted from the server to the storage system manager 202. The storage system manager 202 may safely charge the batteries by using the aforementioned information.

In this manner, the smart storage 200 may be configured to monitor the safety and the reliability and contributed to optimization of load sharing.

Figure 9:
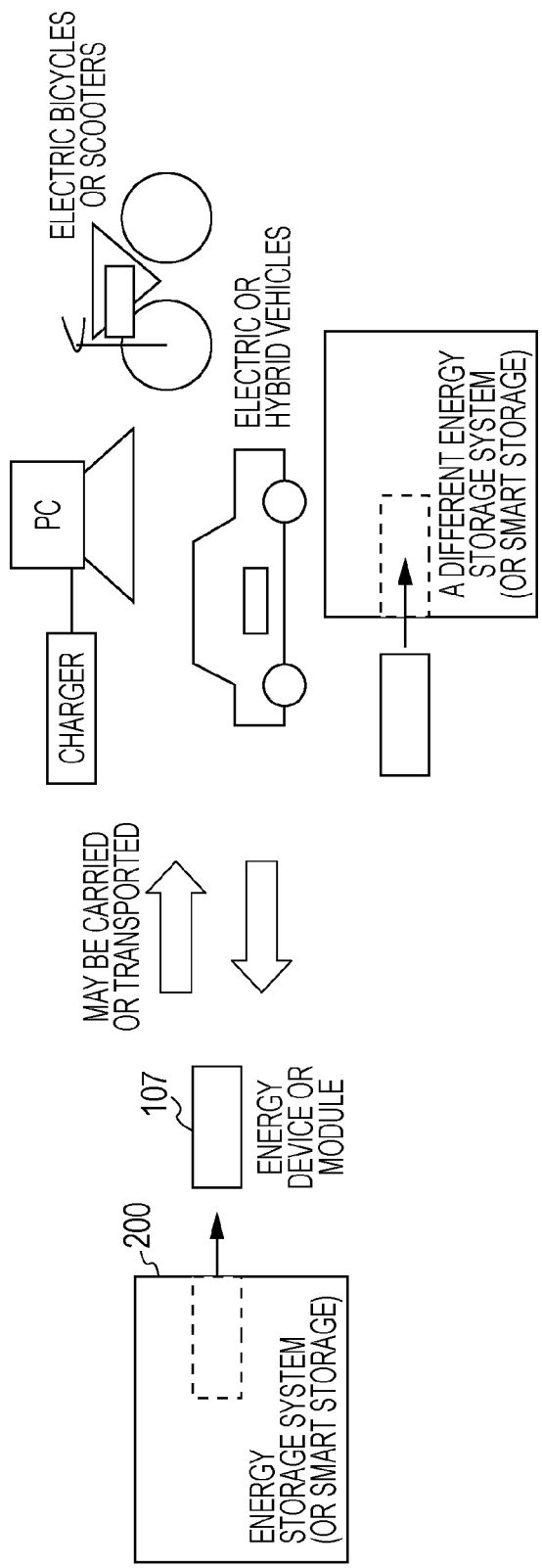
FIG. 9 is a schematic diagrammatic view illustrating an example of a use of a smart storage according to an embodiment.

As shown in FIG. 9, the battery 107 detached from the socket of the smart storage 200 is used for other applications. In other words, since the battery 107 has portability, the battery 107 may be used as a power supply of a personal computer, a power supply of a home electronic apparatus, a power supply of an electric vehicle (electric bicycle), and the like. In addition, a structure of the battery necessary for the socket insertion is standardized, so that the battery may be inserted to the socket of a different smart storage. In addition to a physical configuration such as a shape of the battery, signal processing necessary for accessing such as an interface is also unified.

When the energy device (battery 107) is inserted into the socket of the device manager 201, mutual authentication between the battery 107 and the storage system manager 202 is initiated. The energy device 201 and the storage system manager 202 include an authentication IC as an authentication module or a combination of a microcomputer and authentication software. As the mutual authentication scheme, ISO/IEC 9798 entity authentication based scheme in the related art may be used. The communication data for the mutual authentication are transferred via an information bus of the storage system manager 202.

The mutual authentication between the battery 107 and the storage system manager 202 is completed, the charging operation, the discharging operation, the protecting operation of the battery 107 may be performed under the control of the storage system manager 202. The charging/discharging initiating command, the charging/discharging ending command, the charging voltage information, the charging current information, and the like are transacted via the information bus. In order to prevent wiretapping of the commands and information and to prevent falsification, the encryption of the data transacted between the battery 107 and the storage system manager 202 and the message authentication code (MAC: message authentication code) may be effectively used. In order to implement the data encryption and the message authentication code at high speed and low cost and with low power consumption, a common key block encryption method such as AES (advanced encryption standard) and CLEFIA (128-bit block encryption method developed by Sony) is effectively used. A Key (encryption key) for encryption and decoding and a MAC generation/verification key (MAC key) are shared by using a key sharing protocol at the time of mutual authentication between the battery 107 and the storage system manager 202 in advance.

When the storage system manager 202 and the home controller 204 are connected to each other, the mutual authentication therebetween is performed. If a mutual authentication scheme is supported by standards of wired, wireless, and PLC communication methods used for the connection, the mutual authentication scheme may be used. If the mutual authentication and the encryption communication are not supported, similarly to the case between the battery 107 and the energy system manager 202, the mutual authentication is performed after the connection, so that the key sharing is performed.

When the mutual authentication between the storage system manager 202 and the home controller 204 is established and the key sharing is completed, the charging states of the batteries, the storage control information, and the like may be exchanged between the storage system manager 202 and the home controller 204. In order to prevent wiretapping of the communication data and to detect falsification, similarly to the case between the battery and the storage system manager, the encryption and the MAC may be effectively used.

In the case where the storage system manager 202 and the home controller 204 are typically connected to each other and the same key is continuously used, it is preferable in terms of safety that the key sharing protocol is performed periodically and the encryption key and MAC key are updated.

The mutual authentication is also established between the storage system manager 202 and a server on the network. In addition, the mutual authentication is also established between the storage system manager 202 and the power regulating apparatus 203. The mutual authentication is established similar to the mutual authentication between the storage system manager 202 and the home controller 204.

Entire Configuration of the Embodiment

Figure 10:
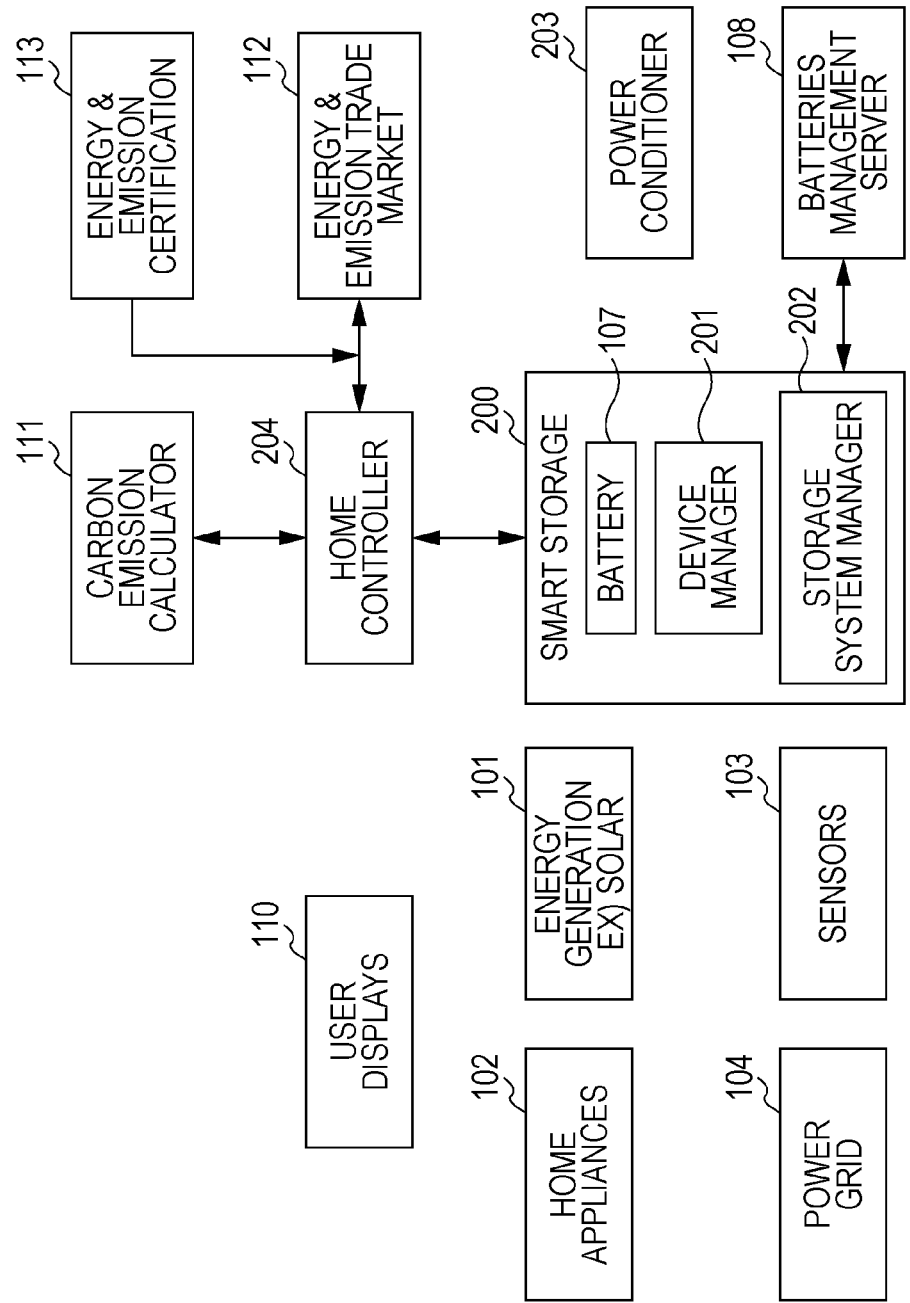
FIG. 10 is a block diagram illustrating the entire configuration of a home energy network system according to an embodiment of an embodiment.

Hereinbefore, the embodiment is schematically described. The entire configuration of the home energy network system according to the embodiment is shown in FIG. 10. As described above with reference to FIG. 8, a smart storage 200 includes a detachable battery 107, a device manager 201, and a storage system manager 202. The storage system manager 202 is configured to communicate with the battery management server 108 on the network.

An energy generation apparatus 101 is provided in the home. The energy generation apparatus 101 is a renewable energy generation system (for example, solar photovoltaic power generation). In addition, home appliances and home appliances 102 and energy/environment sensors 103 are included in the home. Power is supplied to the home through a power network 104.

A display unit 110 of displaying information to a user is provided. Various types of information such as warning that is detected when the storage system manager 202 controls the charging and discharging of the battery 107 are displayed on the display unit 110.

The emission calculator 111 is disposed to be connected to the home controller 204. Current total power consumption of the home detected by the home controller 204 is displayed on the display unit 110. The forms of the components shown as blocks in FIG. 10 may be a form of software or a software-chip set operating on hardware. As an example of the hardware, there is a personal computer, a home appliance, a game machine, a set-top box, a dedicated energy controller, or a storage system manager 202.

In addition, an energy/carbon emission trade market 112 and an energy/carbon emission certification 113 may be associated with the home controller 204.

The storage system manager 202 is constructed with components having all the following functions or a portion of the functions.

The functions includes a function of a DC/AC converter, a function of a power conditioner, a function of a charger, a function of an energy storage and generation apparatus, a wireless charging function, a DC power input/output function, an AC power input/output function, a network connection function, and a function of an energy protocol process apparatus.

Now, an embodiment is described more in detail.

Battery and Smart Storage

The battery 107 corresponds to batteries 107a, 107b, 107c, and 107d shown in FIG. 8 and is standardized to have the following functions.

The battery 107 has a battery ID and is authenticated according to a unified authentication method using a battery ID. The battery ID is information for uniquely identifying the battery. Multi-bit digital data are used for the battery ID. More specifically, a serial number may be used for the battery ID. In addition, hierarchical digital data using a plurality of attributes such as a manufacturer and a type may be used for the battery ID.

The battery 107 is connected to the battery management server 108 through the network and managed by the battery management server 108 via the network.

With respect to the connection between the battery 107 and the storage system manager 202 and the connection between the battery 107 and the other application apparatuses (electric bicycle and the like), a unified standard is defined. As described above, the battery 107 is inserted into the socket of the storage system manager 202. By inserting the battery 107 into the storage system manager 202, the smart storage 200 is configured.

As an example of a battery used as the in-home or mobile battery 107, there are various types of energy devices such as a primary battery, a secondary battery, a capacitor, a solar cell, and a fuel cell. The energy devices may be connected to the storage system manager 202 by using a commonly standardized device manager as an interface. Herein, the device manager is provided with a detachable socket. In addition, an authentication protocol or a control protocol for charging or the like between the battery 107 and the storage system manager 202 is configured to be common to all the energy devices.

Battery ID and Unified Authentication Method

The battery ID is an identifier for managing a battery and fixed-length data for uniquely specifying the battery. Herein, the "battery" is used as a term indicating a battery cell (power generation unit) and a battery pack where the battery cell and a protection circuit for the battery cell are encapsulated by an outer case. The battery ID is necessarily used for management and authentication of the battery 107.

Herein, the "authentication" includes the authentication between the battery 107 and the charging apparatus (included in the storage system manager 202), the authentication between the battery 107 and the application, and the authentication between the storage system manager 202 and the battery management server 108. The battery ID or the charging interface is set to be in a unified standard, and the authentication module is mounted on the battery 107 and each apparatus, so that the authentication is performed. Due to the authentication, checking whether or not the battery 107 or the apparatuses are regular products, checking whether or not the products are regularly operating may be controlled in an integrated manner, so that fire accident caused by abnormal connection may be prevented.

As a form of implement of the battery ID and the authentication module, there is a method where the battery ID and the authentication module are mounted on a microcomputer in the battery in a software manner, a method where an authentication chip of the battery ID and the authentication module are disposed in the battery, or the like. As a communication method for the authentication, there is a method of using a communication interface such as UART (Universal Asynchronous Receiver-Transceiver), a method of using a sensor network according to a radio communication standard such as Bluetooth, ZigBee, and Wi-Fi, or the like. The Bluetooth method is adapted to multimedia communication, so that point-to-multipoint connection communication may be implemented. In the ZigBee, a physical layer of IEEE (Institute of Electrical and Electronics Engineers) 802.15.4 is used. The IEEE 802.15.4 is the name of a short-range wireless network standard, which is referred to as PAN (Personal Area Network) or W (Wireless) PAN.

Battery Management Server

The battery management server 108 has the following functions.

1. The battery management server 108 includes the authentication information and a battery-status sensor to collect information on the to-be-managed battery 107 (the battery allocated with the battery ID) through the storage system manager 202 having the network communication function. In other words, the battery management server 108 has a function of collecting basic information (manufacturer, product number, data of production, and the like), status information (terminal voltages, internal resistance, temperature, discharge current amount, the number of charging and discharging cycles, and the like), a use history, and the like of the battery 107.

2. The battery management server 108 has a function of storing product information such as output power, energy density, and charging/discharging performance of the battery 107 and providing the information or commands so that the charging apparatus in the storage system manager 202 performs charging management appropriate to the status or use condition of each battery.

3. The battery management server 108 has a function of detecting an abnormal operation (departing from normal operation data) of the battery at the time of charging or at the time of using for an application and issuing warning to the storage system manager 202.

4. The battery management server 108 has a function of receiving abnormal information, accident information, or recall information from a user, a battery manufacturer, or the like and transmitting a notice to a user who uses the battery or to the storage 202.

5. The battery management server 108 has a function of cooperating with applications of apparatuses on the network, home apparatuses, or portable apparatuses so as to use the battery with excellent advantages in terms of economical efficiency, environmental load, and convenience.

Module Connectivity According to Unified Standard

Various output powers and capacities are necessary for the battery according to the applications. In order cope with the various output powers and capacities, the shapes and input/output terminals (sockets) of the batteries are configured in a unified standard, so that a battery module optimized to each application may be configured by connecting the batteries. The compatibility (output power, capacity, and the like) of the configured battery module to the application or the control of the charging current and voltage can be verified by inquiring of the battery management server 108 through the storage system manager 202. Therefore, the battery may be safely or appropriately used for a plurality of the applications.

Example of Authentication Operation

The authentication operation is described with reference to FIG. 11. The battery ID is written in each battery 107 at the time of manufacturing thereof. In the case where the authentication module is mounted in a software manner, the battery ID is stored in a protection area in a memory of a microcomputer of the battery. In the case where the authentication module is mounted in a hardware manner, the battery ID is written in a non-volatile memory on an authentication chip. The battery ID includes data for uniquely specifying a battery (manufacturer, product number, data of production, place of production, factory line number, serial number, version information, and the like). In addition, a charging apparatus (storage system manager 202) is also allocated with an ID (device ID unique to a device).

Figure 11:
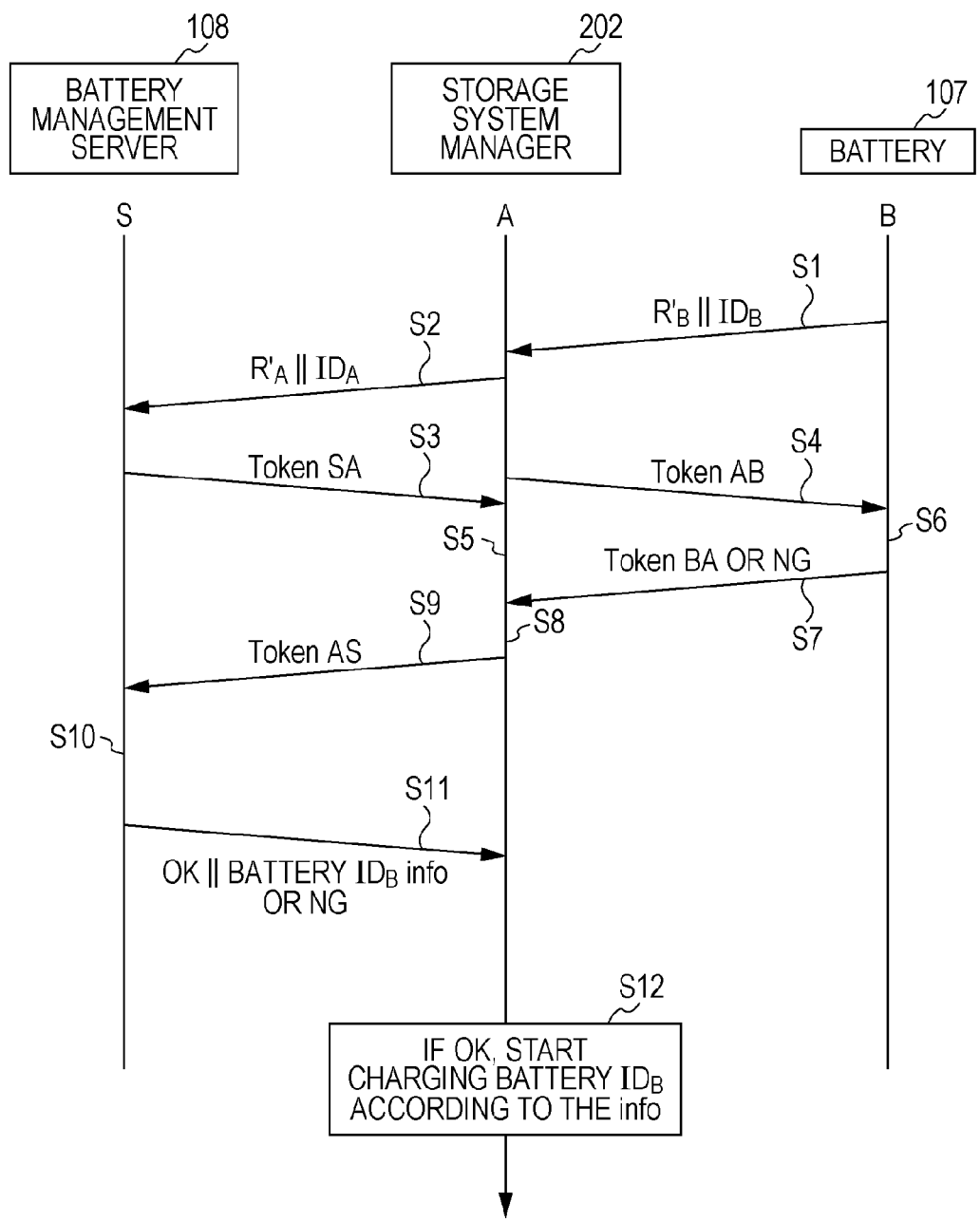
FIG. 11 is a schematic diagrammatic view illustrating a protocol of an authentication operation at the time of charging a battery according to an embodiment.

After the authentication protocol shown in FIG. 11 is performed, if the authentication is established, the charging of the battery is initiated by the charging apparatus. FIG. 11 illustrates the authentication between the battery 107 and the storage system manager 202 and the authentication between the storage system manager 202 and the battery management server 108.

The two authentication operations are performed in parallel, so that time necessary for the processes may be reduced. In addition, if the authentication between the storage system manager 202 and the battery 107 is established, the storage system manager 202 may initiate the charging of the battery 107. Accordingly, even in an environment where the connection to the network is not established, the charging of the battery 107 may be performed.

In FIG. 11, the character "B" is used to indicate the battery 107; the character "A" is used to indicate the storage system manager (charging apparatus) 202; and the character "S" is used to indicate the battery management server 108. Hereinafter, in the description of the protocol, these abbreviated reference numerals are used.

Tokens in the authentication protocol shown in FIG. 11 are as follows.

Token AB=E ($K_{AB}$, $R_A$|$R_B$|$ID_B$)
Token BA=E ($K_{AB}$, $R_B$|$R_A$)
Token SA=E ($K_{SA}$, $R_S$|$R_A'$|$ID_A$)
Token AS=E ($K_{SA}$, $R_A'$|$R_S$)

In the above equations, the notations are as follows.

$K_{AB}$: a key shared in advance between the storage system manager A and the battery B.

$K_{SA}$: a key shared in advance between the battery management server S and the storage system manager A.

Communication for sharing the key may be performed in advance.

$R_A$ $R_A'$: a random number generated in the storage system manager A.

$R_B$: a random number generated in the battery B.

$R_S$: a random number generated in the battery management server S.

The random numbers are generated by a random number generator using information of a remaining capacity of the battery, information on the sensors, and the like.

$ID_A$: an ID of the storage system manager A (properly, referred to as a device ID).

$ID_B$: an ID of the battery B (properly, referred to as a battery ID).

E (K, D): data obtained by encrypting data D with a key K.

D1|D2: data obtained by connecting data D1 and data D2.

The authentication protocol is performed as follows.

Step S1: the battery B generates the random number $R_B$ and transmits the random number $R_B$ associated with the battery ID ($ID_B$) to the storage system manager A.

Step S2: after Step S1, the storage system manager A generates the random number $R_A'$ and transmits the random number $R_A'$ associated with the device ID ($ID_A$) to the battery management server S.

Step S3: after receiving data, the battery management server S generates the random number $R_S$ and transmits the Token SA to the storage system manager A.

Step S4: after receiving the data transmitted from the battery B, the storage system manager A generates a different random number $R_A$ and transmits the Token AB to the battery B.

Step S5: the storage system manager A decodes the Token SA transmitted in Step S3, determines whether or not the random number $R_A'$ extracted from the decoded data is coincident with the random number transmitted in Step S2, and checks whether or not the device ID ($ID_A$) is correct.

Step S6: the battery B which receives the Token AB transmitted in Step S4 decodes the Token AB, determines whether or not the random number $R_B$ extracted from the decoded data is coincident with the random number transmitted in Step S1, and checks whether or not the battery ID ($ID_B$) is correct.

Step S7: In the case where the result of the determination and checking of Step S6 is OK, the battery B transmits the Token BA to the storage system manager A. If the result is not OK, NG information is transmitted to the storage system manager A.

Step S8: the storage system manager A, which receives the Token BA, decodes the Token BA, determines whether or not the random number $R_B$ extracted from the decoded data is coincident with the random number transmitted in Step S1, and determines whether or not the random number $R_A$ is coincident with the random number transmitted in Step S4. If all the results of the determination are "coincident", the mutual authentication between the storage system manager A and the battery B is completed. If not, it is determined that the mutual authentication is not established.

Step S9: In the case where the result of the determination and checking of Step S5 is OK, the storage system manager A transmits the Token AS to the battery management server S. If the result is not OK, NG information is transmitted.

Step S10: the battery management server S, which receives the Token AS, decodes the Token SA, and determines whether or not the random number $R_A'$ extracted from the decoded data is coincident with the random number transmitted in Step S2. If the random number is determined to be coincident, the mutual authentication between the battery management server S and the storage system manager A is completed.

Step S11: If the authentication of Step S10 is established, the battery management server S searches for the battery ID ($ID_B$) in the database. The battery management server S checks whether there is no accident information and no recall information on the corresponding battery. If it is checked that there is no accident information and no recall information, the battery management server S transmits OK information and charging control information info necessary to charge the battery B to the storage system manager A. In the case where the mutual authentication is not established in Step S10, the NG information indicating non-establishment of the mutual authentication is transmitted.

Step S12: if the storage system manager A receives the OK information from the battery management server S in Step S11, the storage system manager A initiates the charging of the battery B according to the charging control information.

The battery management server S monitors the operations of the battery B and the operations of the storage system manager A during the charging time. In the case where the departing from the data of the normal operations is detected, the battery management server S issues a warning to the storage system manager A. If the charging is completed, a message indicating charging completion is displayed on the display unit of the storage system manager A. In addition, if the charging is completed, the status of the battery B is updated in the battery management server S. Next, the session between the battery management server S and the storage system manager A is disconnected.

If the storage system manager A receives the NG information from the battery management server S, it is determined that the authentication fails. A message indicating the authentication fails is displayed on the display unit of the storage system manager A. In this case, the operation of charging the battery B is not initiated by the storage system manager A.

The order of the aforementioned authentication protocols is an example. Therefore, the mutual authentication between the battery management server S and the storage system manager A and the mutual authentication between the storage system manager A and the battery B may be independently performed in parallel. Accordingly, the authentication time may be reduced.

In addition, in the case where the mutual authentication between the battery management server S and the storage system manager A is performed in advance and the connection to the network is performed, only the mutual authentication between the storage system manager A and the battery B may be performed, and the establishment of the authentication is notified to the battery management server S. The charging is initiated according to the abnormal information, accident information, recall information, or charging control information of the battery B obtained in Step S11.

In addition, in the environment where the connection to the network is not established (in the offline environment), the user may select a mode where an inquiry of the battery management server is not performed. In other words, if the processes (Steps S1, S4, S6, S7, and S8) for the mutual authentication between the storage system manager A and the battery B are completed, the charging is initiated. In the offline environment, since the charging control information may not be received from the battery management server, it is preferable that the charging control information is written in the recording medium bundled with the battery.

In addition, in the mode (offline mode) were the network is not connected, the abnormal information, accident information, recall information, or charging control information of the battery B may not be obtained from the battery management server S. In the storage system manager A, the latest information of the battery during the use thereof in the home network is typically stored, so that the information may be configured to be used by the user's instruction in the mode (offline mode) where the network is not connected.

In addition, in the mode (offline mode) where the network is not connected, the status of the battery may not be uploaded to the battery management server S. Therefore, the storage system manager A is configured to store the status of the battery. At the next connection to the battery management server, the status is transmitted, and the battery management server updates the information on the battery based on the information.

In addition, in order to prevent counterfeiting or camouflaging of the authentication protocol due to a replay attack (re-transmission attack) or the like, the randomness of the random numbers $R_S$, $R_A$, and $R_B$ generated by the aforementioned entities is important. Although a random number generation module may be considered to be mounted on the battery management server S or the storage system manager A, it is not practicable in terms of resources and cost that the random number generation module is mounted on each of the batteries. With respect to the batteries, it may be considered that lower bit data of current values having large difference are considered to be generated in combination of time information, battery IDs, or the like.

Authentication at the Time of Using (Discharging) Battery

The aforementioned authentication process is a process in the case of charging the battery. In the case where the battery is used in a configuration where the battery is mounted on the application, the mutual authentication between the battery and the application is performed. The mutual authentication at the time of using the battery is also performed according to the same protocol as that for the aforementioned mutual authentication between storage system manager and the battery.

Figure 12:
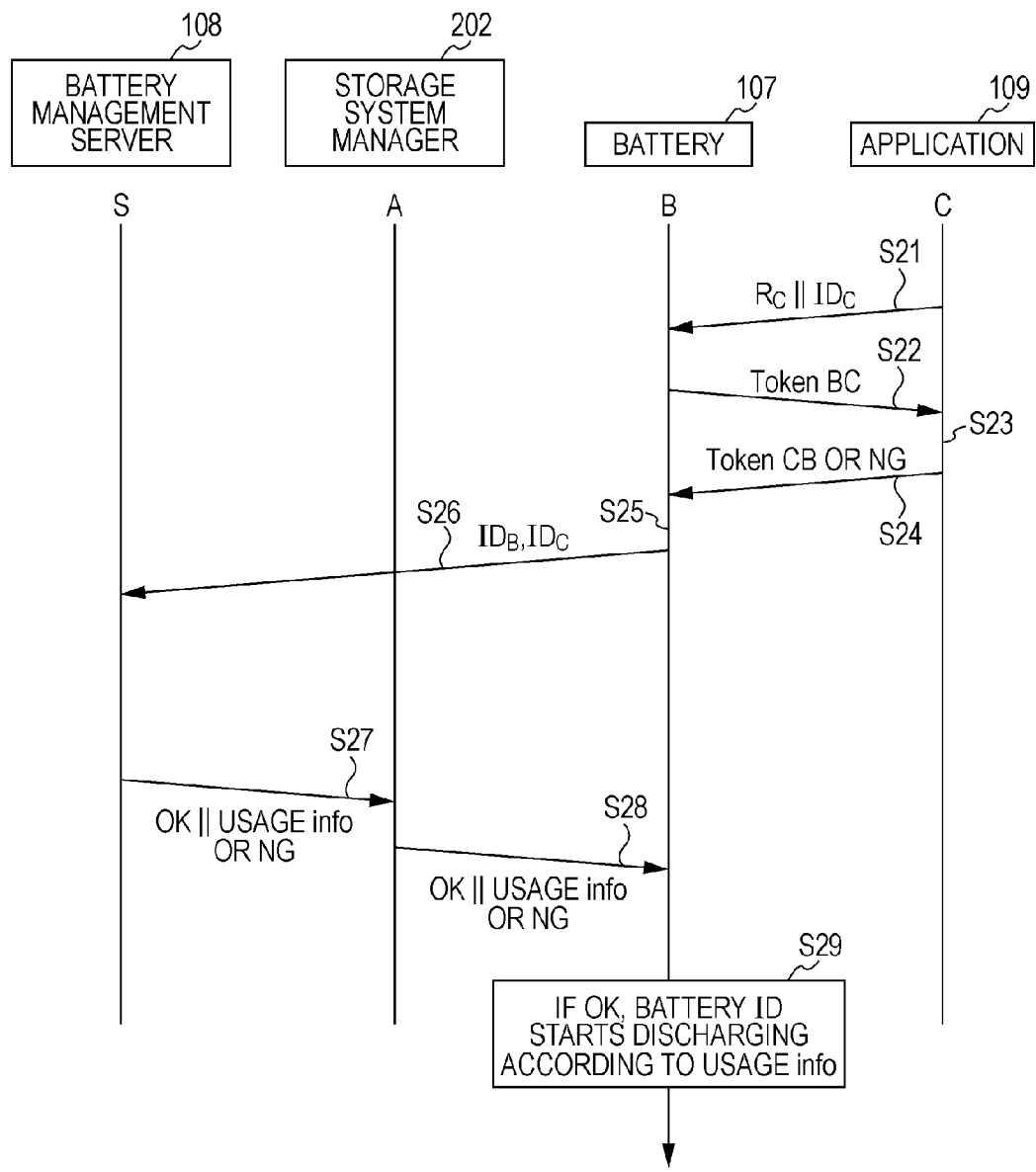
FIG. 12 is a schematic diagrammatic view illustrating a protocol of an authentication operation at a time of discharging a battery according to an embodiment.

If the battery 107 is mounted on the application 109, after the authentication protocol shown in FIG. 12 is performed, the discharging is initiated, so that the application 109 may be used. Herein, the application 109 is also configured to be allocated with an ID. In addition, between the battery B and the battery management server S and between the battery B and the system manager A, the mutual authentication is completed in advance according to the protocol shown in FIG. 11, and the connection to the network is established.

Tokens in the authentication protocol shown in FIG. 12 are as follows.

Token BC=E ($K_{BC}$, $R_B|R_C|ID_C$)

Token CB=E ($K_{BC}$, $R_C|R_B$)

In the above equations, the notations are as follows.

$K_{BC}$: a key shared in advance between the battery B and the application C.

Communication for sharing the key may be performed in advance.

$R_B$: a random number generated in the battery B.

$R_C$: a random number generated in the application C.

The random numbers are generated by a random number generator using information of a remaining capacity of the battery, information on the sensors, and the like.

$ID_C$: an ID of the application C (properly, referred to as an application ID).

E (K, D): data obtained by encrypting data D with a key K.

D1|D2: data obtained by connecting data D1 and data D2.

The authentication protocol is performed as follows.

Step S21: the application C generates the random number $R_C$ and transmits the random number $R_C$ associated with the application ID ($ID_C$) to the battery B.

Step S22: after Step S21, the battery B generates the random number $R_B$, generates the Token BC, and transmits the Token BC to the application C.

Step S23: the application C, which receives the Token BC transmitted in Step S22, decodes the Token BC, determines whether or not the random number $R_C$ extracted from the decoded data is coincident with the random number transmitted in Step S21, and checks whether or not the application ID ($ID_C$) is correct.

Step S24: In the case where the result of the determination and checking of Step S23 is OK, the application C transmits the Token CB to the battery B. If the result is not OK, NG information is transmitted to the battery B.

Step S25: the battery B, which receives the Token CB transmitted in Step S24, decodes the Token CB, determines whether or not the random number $R_C$ extracted from the decoded data is coincident with the random number transmitted in Step S21, and determines whether or not the random number $R_B$ is coincident with the random number transmitted in Step S22. If all the results of the determination are "coincident", the mutual authentication between the battery B and the application C is completed. If not, it is determined that the mutual authentication is not established, and the process is ended.

Step S26: in the case where the result of the determination in Step S25 is OK, the battery B transmits the battery ID ($ID_B$) and the application ID ($ID_C$).

Step S27: the battery management server S searches for the $ID_B$ and the $ID_C$ as keys in the database. The battery management server S checks whether there is no accident information and no recall information on the corresponding battery. In addition, the battery management server S checks whether or not the corresponding battery is to be appropriately used for the application C. If it is checked that there is no problem, the OK information and the discharging control information info necessary for the using in the application C is transmitted to the storage system manager A. If it is checked that there is a problem, NG information is transmitted.

Step S28: the storage system manager A stores the received information and transmits necessary information to the battery B.

Step S29: When the battery B receives the OK information in Step S28, the battery B initiates the discharging according to the received discharging control information. In this manner, the battery may be used for the application C.

The storage system manager 202 monitors the operations of the battery 107 and the operations of the application 109. In the case where departing from the data of the normal operations is detected, the storage system manager 202 displays a warning on the display unit 110. In addition, the storage system manager 202 uploads the battery using information to the battery management server 108 periodically. In the case where the application 109 is a mobile application, a user at an outdoor site transmits information to the battery management server 108 or the storage system manager 202 through an external network so as to perform the monitoring control corresponding to the aforementioned control.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electric power apparatus comprising:
an energy device;
a device manager; and
a storage system manager,
wherein the energy device includes at least one of a primary battery, a secondary battery, a capacitor, a solar cell and a fuel cell,
wherein the device manager or the storage system manager has storage information,
wherein the device manager or the storage system manager receives or transmits the storage information from or to a home controller which controls the home electric power, and
wherein the storage system manager and the home controller perform mutual authentication.

2. The electric power apparatus according to claim 1, wherein the energy device has an ID and performs mutual authentication with respect to the storage system manager by using the ID.

3. The electric power apparatus according to claim 1, wherein the storage information includes one or more of: a using status of the energy device, characteristics of the energy device, a type of the energy device, a temperature of the energy device, a capacity of the energy device, a resistance value of the energy device, an output voltage from the energy device, an output current from the energy device, a remaining capacity of the energy device.

4. The electric power apparatus according to claim 1, wherein the device manager and the storage system manager are configured to receive and transmit the storage information.

5. The electric power apparatus according to claim 1, wherein the device manager receives or transmits the storage information from or to the storage system manager via an information bus.

6. The electric power apparatus according to claim 1, wherein the device manager or the storage system manager receives or transmits the storage information from or to a server on a network.

7. The electric power apparatus according to claim 1, wherein the device manager or the storage system manager receives or transmits the storage information from or to a power regulating apparatus.

8. The electric power apparatus according to claim 1, wherein the storage system manager receives or transmits the storage information from or to the device manager.

9. The electric power apparatus according to claim 8, wherein the device manager, the storage system manager, or a home controller acquires storage control information from a server on a network.

10. The electric power apparatus according to claim 9, wherein the storage control information includes one or more of: information on a product, information on maintenance, information on trouble, information on climate, charging control information, discharging control information.

11. The electric power apparatus according to claim 9, wherein the device manager, the storage system manager, or the home controller controls the energy device according to the storage control information.

12. The electric power apparatus according to claim 1, wherein the home controller supplies the storage information to a server on a network.

13. A power control system comprising:
  an electric power apparatus having an energy device, a device manager, and a storage system manager;
  a home controller;
  a power regulating apparatus,
  wherein the energy device includes at least one of a primary battery, a secondary battery, a capacitor, a solar cell and a fuel cell,
  wherein the device manager or the storage system manager has storage information,
  wherein the device manager or the storage system manager receives or transmits the storage information from or to a home controller which controls the home electric power, and
  wherein the storage system manager and the home controller perform mutual authentication.

* * * * *